United States Patent
Crecelius

[15] 3,698,185
[45] Oct. 17, 1972

[54] METHOD FOR DISPERSING DISCRETE PARTICLES

[72] Inventor: John D. Crecelius, Ridgecrest, Calif.

[73] Assignee: The United States of America as represented by the Secretary of the Navy

[22] Filed: Oct. 1, 1969

[21] Appl. No.: 866,072

[52] U.S. Cl..............................60/39.02, 60/39.66
[51] Int. Cl.................................................F02g 9/00
[58] Field of Search..........60/39.02, 204, 39.66, 266; 222/399, 373, 152, 335; 244/136, 3.16; 239/290

[56] References Cited

UNITED STATES PATENTS 2,610,433   9/1952   Chisholm et al...........222/399
3,267,857   8/1966   Lindberg....................102/105
3,279,193   10/1966  Webb.........................102/105

*Primary Examiner*—Samuel Feinberg
*Attorney*—R. S. Sciascia, Roy Miller and Gerald F. Baker

[57] ABSTRACT

A slurry of metal flakes and freon is carried in a pressure tank connected to a supply tank of pressurized gas and to a distribution manifold attached near the exhaust pipe of a vehicle. When the slurry is released, the metal flakes are dispensed into the area surrounding heat radiating portions of the vehicle.

4 Claims, 1 Drawing Figure

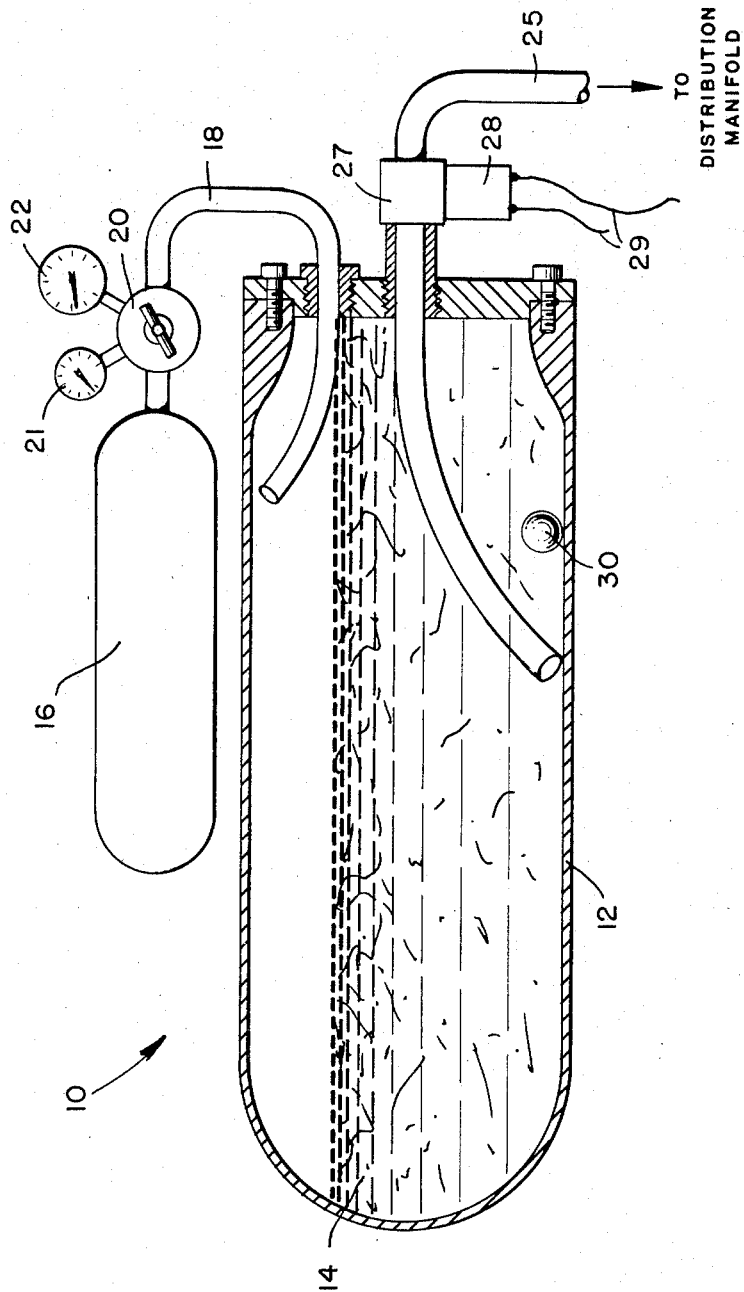

METHOD FOR DISPERSING DISCRETE PARTICLES

BACKGROUND OF THE INVENTION:

Since the advent of heat seeking missiles and other homing devices, many countermeasures have been developed. Metal shields of various description, for example, have been attached to aircraft or other vehicles to attenuate the heat signature of exhaust systems. Although some measure of success is attributable to these shields, some sacrifice of weight and, in the aircraft applications, aerodynamic stability is often involved. Further, the attachment of such shields is usually time consuming and may involve special equipment.

The system according to the present invention does not add as much weight as the usual exhaust shield and may be quickly attached to vehicles not equipped with such shields and the device is easily removed. The container and equipment occupy only a small space in the vehicle and the manifold is of such size that it does not appreciably affect the aerodynamic qualities of an aircraft. Obfuscation of the IR signature, for example, is as good or better than that of known heat shields.

The present invention is related to the method and apparatus disclosed in assignee's copending application, Ser. No. 866,073 filed Oct. 1, 1969, entitled Method and Apparatus for Suppression of Heat Radiation.

BRIEF DESCRIPTION OF THE DRAWING

The single FIGURE of the drawing is a side view, partly in cross section, of one embodiment of apparatus usable in dispensing particles in accordance with the invention.

DETAILED DESCRIPTION OF THE INVENTION

According to the present invention, there is provided a means for surrounding radiating portions of an engine driven craft with an obfuscating screen of discrete metal particles.

The Figure on the drawing illustrates a practical embodiment of a device for dispensing a slurry of metal flakes for dispersal in accordance with the invention.

The device 10 comprises a tank 12 containing a slurry 14 of metal flakes and freon. The tank is pressurized by nitrogen gas, for example, supplied by a tank 16 connected to tank 12 through a pipe 18. The gas supply tank 16 is provided with the usual manually operable pressure regulator 20 and guages 21, 22 so that pressure in line 18 and, thus, in tank 12 may be maintained at the desired level. The slurry of metal flakes is released, when desired, through pipe 25 by actuation of a valve 27 which advantageously is operated by a solenoid 28, which solenoid may be connected to a remote switch (not shown) by means of conductors 29. The metal flakes are maintained in a suspended state in the freon by the action of a ball bearing, for example, as shown at 30. Any motion of tank 12 will cause movement of the ball bearing 30 and thus the stirring of the slurry 14.

The metal flakes may be dispersed, for example, by any of the manifold structures described and illustrated in the above-mentioned copending application. As the slurry is dispersed in the atmosphere the freon rapidly evaporated leaving a cloud of dry metal flakes which very effectively attenuates the radiation signal in the vicinity thereof.

What is claimed is:

1. The method of attenuating the heat radiation signature of a heat exhausting vehicle engine comprising:

storing on said vehicle a pressure container of particulate material;

temporally pressurizing said container to convey a quantity of said material to the vicinity of a heat radiating portion of said vehicle or engine; and dispersing said material into the immediate area surrounding said hate radiating portion;

said particulate material being a slurry of metal particles in a liquid.

2. The method of claim 1 wherein the metal particles comprise aluminum.

3. The method of claim 1 wherein the liquid is freon.

4. The method of claim 3 wherein the metal particles are aluminum in flake form.

* * * * *